United States Patent
Lerner et al.

(10) Patent No.: US 6,588,527 B2
(45) Date of Patent: Jul. 8, 2003

(54) AUTOMATICALLY ROCKING STROLLER (75) Inventors: William S. Lerner, 215 E. 68th St., Apt. 23A, New York, NY (US) 10021-5729; Edward R. Green, Brooklyn, NY (US)

(73) Assignee: William S. Lerner, New York, NY (US)

( * ) Notice: Subject to any disclaimer, the term of this patent is extended or adjusted under 35 U.S.C. 154(b) by 12 days.

(21) Appl. No.: 09/991,847

(22) Filed: Nov. 23, 2001

(65) Prior Publication Data

US 2003/0098562 A1 May 29, 2003

(51) Int. Cl.⁷ ................................................ B62B 9/22
(52) U.S. Cl. .................. 180/166; 280/642; 280/650; 280/47.41; 297/270.1; 5/109
(58) Field of Search ............................. 280/47.41, 47.1, 280/47.12, 43.21, 30, 43.22, 47.38, 85, 642, 645, 647, 650, 652, 654, 657; 180/166; 297/270.1, 270.2, 270.3, 281, 282; 5/109; 185/9, 37; 74/44, 49, 50, 25, 422

(56) References Cited

U.S. PATENT DOCUMENTS

| | | |
|---|---|---|
| 63,541 A | 4/1867 | Madison |
| 139,838 A | 6/1873 | Dervost et al. |
| 203,582 A | 5/1878 | Borchardt |
| 247,162 A | 9/1881 | Burton |
| 270,561 A | 1/1883 | Wood |
| 315,165 A | 4/1885 | Post |
| 425,612 A | 4/1890 | Johnson et al. |
| 584,169 A | 6/1897 | Stock |
| 618,337 A | 1/1899 | Duffner |
| 630,422 A | 8/1899 | Stock |
| 732,426 A | 6/1903 | Murray |
| 915,149 A | 3/1909 | Zajac |
| 1,112,595 A | 10/1914 | Brown |
| 1,197,014 A | 9/1916 | Cunningham |
| 1,241,357 A * | 9/1917 | Drosdowet ................. 297/270.3 |
| 1,336,725 A | 4/1920 | Biwoin |
| 1,357,878 A | 11/1920 | Lark |
| 1,385,959 A | 7/1921 | Weasler |
| 1,421,260 A * | 6/1922 | Kurnick .................... 297/270.2 |
| 1,480,451 A | 1/1924 | Koch |
| 1,508,500 A * | 9/1924 | Bingen et al. ............... 180/166 |
| 1,524,416 A * | 1/1925 | Waitekaites et al. ............ 5/109 |
| 1,553,889 A * | 9/1925 | Boettcher ................... 180/166 |
| 1,586,411 A | 5/1926 | Csima |
| 1,617,037 A * | 2/1927 | Vlcek .......................... 180/166 |

(List continued on next page.)

OTHER PUBLICATIONS

COMBI International Corporation 2001 Consumer Catalogue.

Primary Examiner—Brian L. Johnson
Assistant Examiner—Hau Phan
(74) Attorney, Agent, or Firm—Steven Horowitz (57) ABSTRACT

A device for automatically rocking a stroller. Winding structure includes a connecting rod, whose first end is eccentrically mounted to the spring structure and whose second end is equally eccentrically mounted to the wheel axle extension so that the forward movement of the stroller winds the spring structure. The rocking structure includes a rod whose far end is mounted eccentrically to the wheel axle extension and whose forward end is less eccentrically mounted to the spring structure to ensure that the rod assumes a reciprocating motion during the unwinding of the spring structure. The user switches from winding mode to rocking mode. In an alternative embodiment a first rod attached to the shaft includes a lever that assumes different positions, the different lever positions changing the degree to which a second rod is eccentrically mounted to the spring structure and determining whether the device is in winding or rocking mode.

22 Claims, 3 Drawing Sheets

U.S. PATENT DOCUMENTS

| | | | | |
|---|---|---|---|---|
| 1,662,754 A | * | 3/1928 | Millard | 180/166 |
| 2,137,574 A | | 11/1938 | Kromer | |
| 2,608,697 A | * | 9/1952 | Condemi | 5/109 |
| 2,644,958 A | * | 7/1953 | Davis | 5/109 |
| 2,689,355 A | | 9/1954 | Frank | |
| 2,708,585 A | | 5/1955 | Garnes | |
| 2,869,145 A | * | 1/1959 | Gregory | 5/109 |
| 2,904,344 A | | 9/1959 | Lombardo | |
| 3,756,333 A | | 9/1973 | Rubin | |
| 3,806,117 A | | 4/1974 | Foster | |
| 3,820,614 A | | 6/1974 | Askinazy | |
| 5,088,138 A | | 2/1992 | Munster | |
| 5,572,903 A | | 11/1996 | Lee | |
| 5,636,853 A | | 6/1997 | Huang | |
| 6,244,658 B1 | * | 6/2001 | Parent et al. | 297/270.1 |
| 6,375,213 B1 | * | 4/2002 | Suzuki | 280/642 |

\* cited by examiner

AUTOMATICALLY ROCKING STROLLER

BACKGROUND OF THE INVENTION AND DISCUSSION OF THE PRIOR ART

The present invention relates generally to vehicles such as strollers and more particularly to a device that can automatically rock a stroller with a baby in it.

Today's strollers are very sophisticated. They have brakes, they are collapsible, they have means for storing objects either at the rear of the stroller or at the front of the stroller—yet they are not provided with a means for automatically rocking a baby to sleep. Presently, the parents have to use their time and energy and attention to actively rock the stroller.

The need for putting the occupant of a stroller—a baby or a toddler—to sleep is well known. According to the latest research done at McGill University, rocking the baby in a stroller has the same calming effect as using a pacifier. Typically, the rocking is accomplished by a parent who grasps the stroller handles with one or two hands and pushes the stroller back and forth until the child falls asleep. This activity occupies one or more hands of the parent. As one example, in a restaurant, it is plainly inconvenient to have to make use of one or more hands with which to rock the stroller. Other examples abound—such as where the parent stays home and needs to do work while caring for the baby and does not have either hands free.

Yet despite the existence of other activities the need to lull the child to sleep is very often required. In simple terms, eating (or working) and minding a child are fundamentally incompatible—yet parents are routinely in a situation requiring them to do so. Similarly, minding a first child while trying to a second child to sleep is also often incompatible. Accordingly, there is a great demand and need for some practical and safe means for automatically rocking a child to sleep in a stroller without the use of the parent's hands.

In addition, there is evidence and concern among pediatricians that pacifiers have drawbacks as a means of calming a child. In particular, there is concern that pacifiers, if overused, can cause dependence and could interfere with the proper development of teeth formation. Accordingly, this provides an additional reason why there is a need for a safe and practical device for automatically rocking a child to sleep in a stroller.

It is well known in the art to have a device that automatically rocks a carriage after winding up a spring or motor. For example, U.S. Pat. No. 247,162 to Burton discloses a child's carriage that rocks after a clock mechanism is wound up. U.S. Pat. No. 1,553,889 to Boettcher discloses a carriage that rocks after a motor is actuated. Neither of these disclose a device applicable to strollers nor do they disclose a device that operates merely after the silent unnoticed forward movement of the stroller. It should be noted, moreover, that while it is commonplace for parents to spend literally hundreds of dollars to buy a baby stroller, no stroller on the market is known to automatically rock the stroller.

There is a need for a stroller that can automatically rock the occupant—i.e. the baby or child. Furthermore, there is a particular need for such a device for automatically rocking a stroller by accruing the energy to do the rocking silently and with no effort by the parent other than from the routine and natural pushing of the stroller.

The need for rocking children to sleep is universal but this invention has broader applicability still. There are individuals who need to be calmed not because they are children but because they have a problem. Two examples are presented—autistic children and infirm old people can be rocked in wheelchairs or other vehicles. In each case rocking has been found to calm them. Since health care workers have many responsibilities, it would be very advantageous for companions or health care professionals to be able to trigger an automatically rocking mechanism that acquires its energy merely from the forward movement of the vehicle.

SUMMARY OF THE INVENTION

A device is presented for automatically rocking strollers and other vehicles. Various embodiments are described for automatically rocking strollers that have four stroller wheels (although the device can also operate with vehicles that possess any number of wheels), a frame member and at least one wheel axle extension associated with at least one stroller wheel. The device includes winding structure for accruing stored rotary energy. The winding structure includes a connecting rod, whose first end is eccentrically mounted to the spring structure and whose second end is equally eccentrically mounted to the wheel axle extension so that the simple forward movement of the stroller winds the spring structure unbeknownst to the parent pushing the stroller. In one embodiment the rocking structure includes a rod whose far end is mounted eccentrically to the wheel axle extension and whose forward end is less eccentrically mounted to the spring structure to ensure that the rod assumes a reciprocating motion during the unwinding of the spring structure. The user switches from winding mode to rocking mode. In an alternative embodiment a first rod attached to the shaft includes a lever that assumes different positions, the different lever positions changing the degree to which a second rod is eccentrically mounted to the spring structure and determining whether the device is in winding or rocking mode.

IMPORTANT OBJECTS AND ADVANTAGES

The following important objects and advantages of the present invention are:

(1) to provide a device that allows a stroller to automatically rock-a child to sleep, (2) to provide a device that can automatically rock the stroller by using stored energy that is acquired from the normal forward movement of the stroller without the person pushing the stroller even being aware of it;

(3) to provide a device of simple construction that can allow a user to automatically rock the stroller by moving one switch;

(4) to provide a device that is attachable to existing strollers and that can be manufactured as part of the stroller;

(5) to provide a device that can be used to for automatically rock both collapsible and non-collapsible strollers of all kinds.

(6) to provide a device that be used not only to rock strollers but other wheeled vehicles such as wheelchairs; and (7) to provide a device for rocking strollers automatically that is safe for the occupant of the stroller in that the stroller will not move dangerously away from the user while it is rocking.

DETAILED DESCRIPTION OF THE DRAWINGS AND PREFERRED EMBODIMENT

In order to better understand the present invention in conjunction with the drawings of FIGS. 1–4, the automatically rocking stroller device of the present invention is assigned reference numeral 10 and its elements are described and assigned the reference numerals identified below.

The device 10 of the present invention can be applied to any vehicle in which rocking is necessary, including but not limited to baby strollers, wheelchairs for the aged or autistic children as to whom rocking has a calming effect. Since the most common application is for strollers carrying a child, the preferred embodiment is described in terms of strollers. Accordingly, although the device 10 is illustrated in terms of a stroller, the present invention contemplates that device 10 may be applied to any suitable vehicle. Consequently, the term "stroller" as used in this patent application, including in the claims, refers to both strollers, carriages, wheelchairs and other vehicles for an individual to sit in and be moved using wheels.

Furthermore, the type of stroller for which device 10 is applicable includes both strollers that are collapsible as well as those that are non-collapsible. For standard non-collapsible strollers, there is a rear wheel axle simply runs between the two rear wheels. For collapsible strollers of a type having a first pair of rear wheels, a first rear wheel axle, a second pair of rear wheels and a second rear wheel axle, a first rear wheel axle extension extends toward the second pair of rear wheels and a second rear wheel axle extension extends toward the first pair of rear wheels.

Furthermore device 10 can be situated in any part of the stroller so long as it is fixed to a frame member of the stroller. Device 10 can also be used to rock the stroller by rocking any stroller wheel or set of stroller wheels provided such a stroller wheel has a wheel axle or a wheel axle extension, regardless of whether it is the front of back wheels. It may be preferable although not necessary for device 10 to be applied to a rear wheel axle or rear wheel axle extension or any wheel that allows device 10 to be more out of the way from other parts of the stroller.

Stroller 100 has stroller frame members 30 and typically has three or four stroller wheels 36. It is envisioned by the present invention that the term stroller wheels 36 can also encompass a pair of stroller wheels because collapsible strollers often have a pair of stroller wheels on each of the four corners of the strollers. Often the pair of strollers wheels has an axle between them. Since device 10 applies equally to collapsible and to non-collapsible strollers, stroller wheel 36 refers to either a single or plurality of stroller wheels ata corner of a stroller 100.

At least one such stroller wheel 36 has a wheel axle or wheel axle extension 38 associated with at least one stroller wheel 36. Wheel axle extension 38 or wheel axle 38 is simply an axle that runs through stroller wheel 36 whether or not it extends in that direction to a neighboring stroller wheel.

Device 10 includes spring structure 22 that can be a coil spring and includes the spring housing structure that such coil spring is encased in. Typically, a shaft 21 runs through the center of spring structure 22. Spring structure 22 is connected to switch structure 24. Switch structure 24, which is primarily for switching from winding to rocking mode, as explained further below, includes slip clutch 24, which includes an overwinding prevention structure, and external switch 24a visible to a user. Switch structure 24 includes structure for changing the coil spring 22 from a winding mode to an unwinding mode to allow it to unwind and also selectively disengages the winding structure 16 to activate the rocking structure 40. The operation of switch structure 24 is known to the art. For example, shaft 21 running through spring structure 22 is in two parts, an inner part (not shown) and an outer part 21a. When switch is moved to rocking mode, slip clutch 24 causes outer part 21a of shaft 21 to disengage from inner part of shaft 21 so that outer part 21a of shaft 21 no longer receives rotational motion from spring structure 22.

Alternatively, spring structure 22 includes overwinding prevention structure for preventing overwinding of spring structure 22.

Spring structure 22 is wound simply from the forward motion of the stroller 100. Spring structure 22 is mounted on any suitable stroller frame member 30. Spring structure 22 unwinds when the stroller is stationary and the user moves switch structure to the rocking position.

Winding structure 15 extends from wheel axle extension 38 to spring structure 22 and can be any structure that causes a forward winding of the spring structure 22 upon a forward movement of the wheel axle extension 38 when the stroller 100 is moved forward. Purely by way of example, winding structure 15 can include connecting rod 16 wherein a first end 16a of connecting rod 16 is eccentrically mounted to spring structure 22 and a second end 16b of connecting rod 16 is eccentrically mounted to wheel axle extension 38. Each end 16a, 16b of connecting rod 16 is sufficiently equally eccentrically mounted to their respective support objects (spring structure or wheel axle extension) such that the forward movement of the stroller winds the spring structure. By "sufficiently equally" is meant sufficiently close to being equally eccentrically mounted. In other words, to ensure that the rotational motion of wheel axle extension 38 is transferred to spring structure 22, neither end of connecting rod 16 should be more eccentrically mounted than the other.

It should be noted that what makes something eccentrically mounted to a rotating object is that there is a distance from the point at which it is mounted to that rotating object to the center of that rotating object. By "more" or "less" eccentrically mounted" is meant that the distance to the center of the rotating object is greater or is less in one case than in another case. Winding structure 15 also includes any structure, for example, a pin, pivot or other mounting member, that is used to eccentrically mount each end of connecting rod 16 to the wheel axle extension 38 and to spring structure 22. Each end 16a, 16b of connecting rod 16 is mounted in such a way that each end 16a, 16b of connecting rod 16 rotates when the rotating object to which it is attached rotates.

Other examples of winding structure 15 include a gear train or a series of gears extending from wheel axle 38 to the shaft 21 running through a center of spring structure 22. Still other examples of winding structure 15 include a pulley system with a belt for transferring the rotary motion of wheel axle 38 to spring structure 22.

Device 10 also includes rocking structure 40 that includes a rod 42 mounted to wheel axle extension 38. Rocking structure 40 converts an unwinding of the spring structure 22 into a reciprocating motion of rod 42. One way, a first way, by which rod 42 of rocking structure 40 accomplishes this is by the degree to which each end of rod 42 is eccentrically mounted at its respective location. The type of eccentric mounting referred can be appreciated from looking at FIG. 5 although FIG. 5, it should be noted, is an illustration of a different embodiment A second way, the way that is shown in FIGS. 1–4 and best seen in FIG. 2 and FIG. 3, involves the use of rack and pinion mounting by rod 42 to the area of wheel axle extension 38.

In the first way rocking structure 40 converts an unwinding of the spring structure 22 into a reciprocating motion of rod 42, a far end 42b of the rod is eccentrically mounted to the wheel axle extension 38 and because forward end 42a of rod 42 is sufficiently less eccentrically mounted to spring structure 22 to assure the reciprocating motion by rod 42 when spring structure 22 is allowed to unwind in a direction that is opposite to the direction of the rotation/winding of spring structure 22. This reciprocating motion of rod 42 causes wheel axle extension 38 to alternately move forward and backward when the spring structure 22 unwinds.

This is only one illustration of rocking structure 40. The present invention contemplates any rocking structure 40 that includes a rod and that converts the reverse rotational motion of the unwinding spring structure 22 into an alternatively forward and backward (rocking) motion of the wheel axle extension 38 (and hence the rocking of stroller 100)

Figure 2:
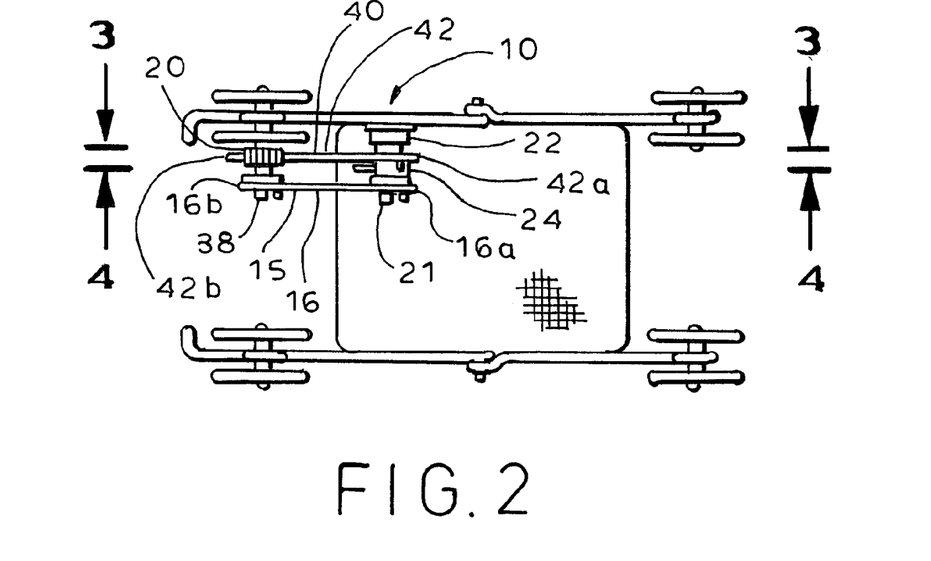
FIG. 2 is bottom plan view of the device of the present invention.
Figure 3:
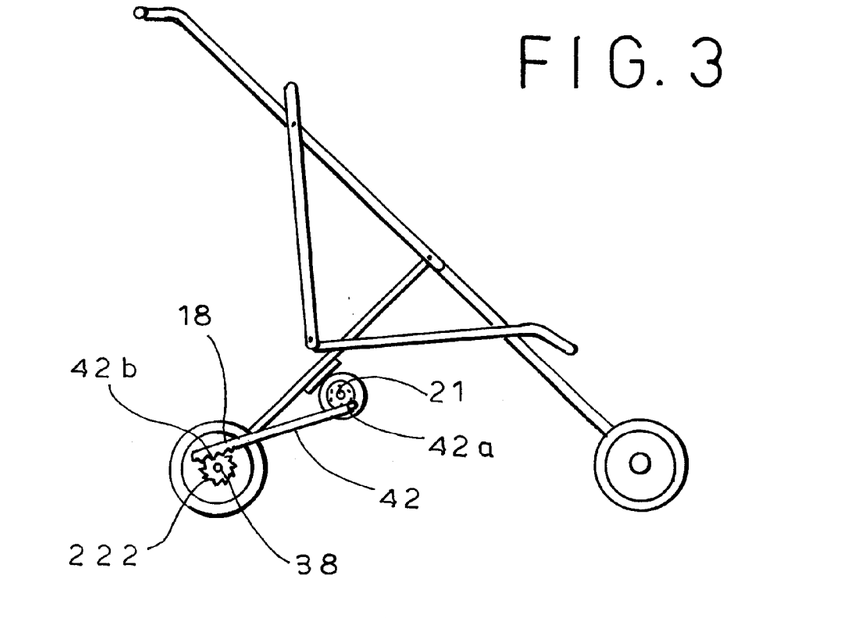
FIG. 3 is a cross-sectional view of the device of the present invention taken along line 3—3 of FIG. 2.
Figure 4:
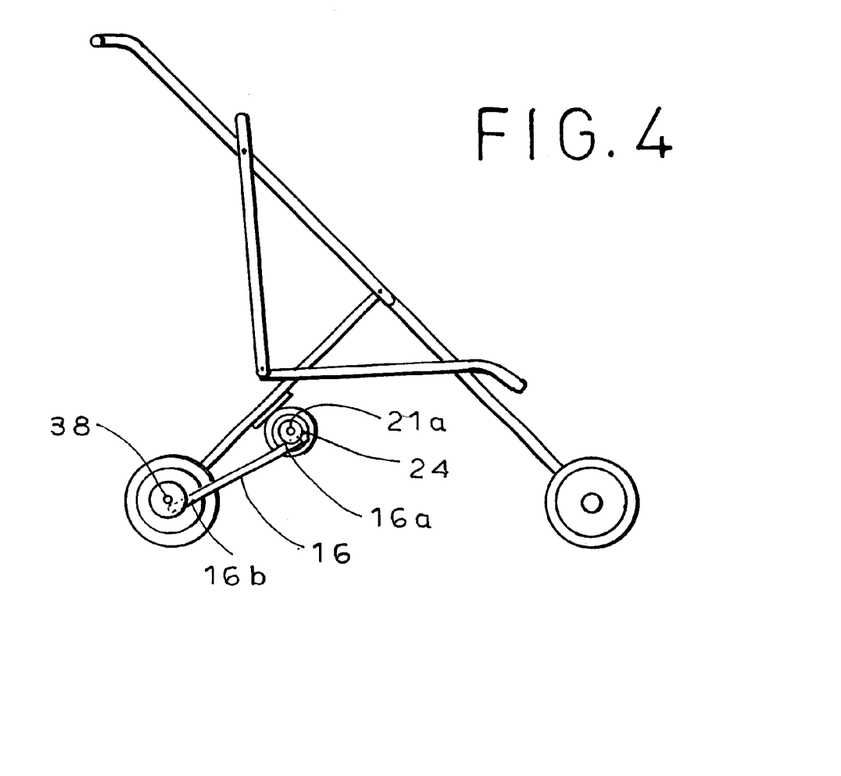
FIG. 4 is a cross-sectional view of the device of the present invention taken along line 4—4 of FIG. 2.

As seen in FIG. 3, the second way by which rocking structure 40 converts an unwinding of the spring structure 22 into a reciprocating motion of rod 42, far end 42b of rod 42 would have rack teeth 18 at an underside of the rod 42 and rack teeth 18 would be adapted to engage a pinion gear 222 attached to wheel axle extension 38. Forward end 42a of rod 42 would still be eccentrically mounted as described. In the embodiment of this second way, the degree of eccentricity of the mounting of forward end 42a of rod 42 to spring structure 22 (i.e. how far away forward end 42a is from a center of spring structure 22 or from a center of a shaft running through spring structure 22) would no longer be critical. In either the first way or in the second way depicted in FIGS. 1–4, there is connecting rod 16 and rod 42 which are separate.

It should be noted with respect to the eccentric mounting of forward end 42a of rod 42 to spring structure 22 as seen in FIG. 2 that shaft 21 does not physically interfere with the movement of forward end 42a of rod 42 due to the fact that shaft 21 is shaped so as to include a U-shaped portion that skirts the motion of forward end 42a. Alternatively, spring structure 22 may be placed between rocking structure 40 and winding structure 15 in which case spring structure 22 is connected to frame member 30a such as by an L-shaped attachment to frame member 30a so that spring structure 22 does not interfere with winding structure 15 or shaft 21.

The user has a simple way in which to activate the automatic rocking of the stroller 100. For example, after taking the child in the stroller 100 to a restaurant the parents want stroller 100 be rocking automatically for fifteen minutes while they eat. Having moved the stroller 100 forward to arrive at the restaurant, spring structure 22 is already wound up and is storing rotational force. Accordingly, the user need only reach to a side or bottom of stroller 100 and move the slip clutch 24 or other switch structure 24 to the rocking position. When spring structure 22 unwinds stroller 100 rocks. The parent or other supervisor can attend to other tasks while only occasionally keeping an eye on stroller 100. When the parent (or other user of device 10) no longer wishes to automatically rock the stroller 100, the user need only move switch 24 back to winding mode. While the stroller 100 moves forward while in the winding position it can not be overwound due to overwinding prevention structure forming part of slip clutch 24 or part of spring structure 22. Also, when stroller 100 is moved backward no effect on the degree of winding of spring structure 22 occurs.

Figure 1:
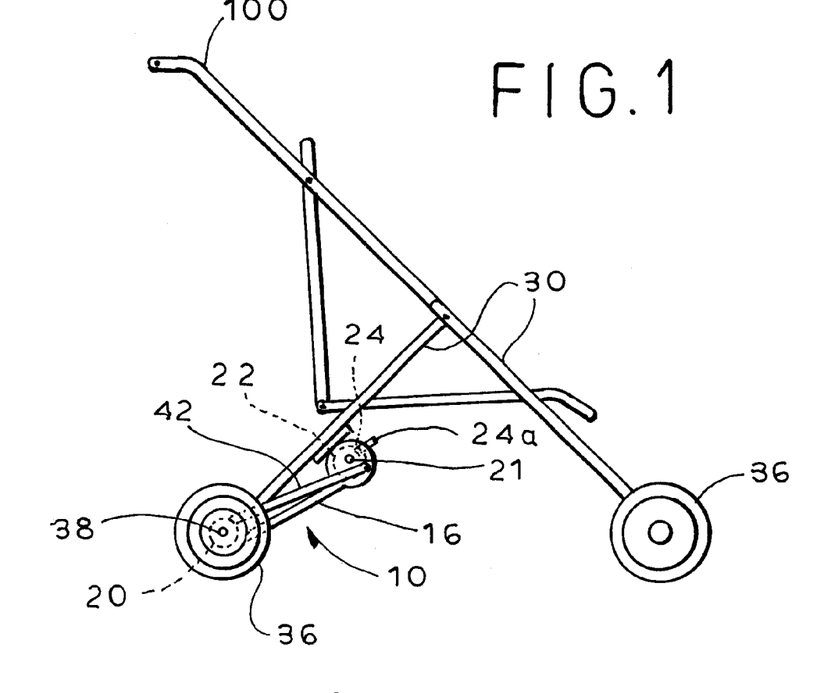
FIG. 1 is a side elevational view of the device of the present invention.

As seen in FIGS. 1–2, switch structure 24 is connected to spring structure 22 and allows the user to move a switch that switches between the activation of the winding structure which is needed during the forward movement of the stroller and the activation of the rocking structure which is needed when the stroller is stationary and the user desires to rock the stroller. Although the illustrated embodiment shows switch structure 24 in a particular way connected to spring structure 22, it is contemplated by the present invention that switch structure 24 can include members anywhere along rocking structure 24 and/or winding structure 40 for the purpose of deactivating one mode and activating the other.

When operation of device 10 is in winding mode it is also contemplated that the user will manually disengage rack teeth 18 of rod 42 from pinion gear 222. In the case where there is no rack teeth 18 but rather eccentric mounting of rod 42, then the user manually disengages far end 42b of rod 42 since far end 42b of rod 42 may be mounted to wheel axle extension 38 by being mounted to a cam (not shown) using well known means such as by sliding or snapping on an off the cam.

If desired, the present invention contemplates a safety feature. To prevent accidental activation of rocking means 24, the movement needed to switch to the activation of rocking structure 40 can be made more complex than a simple single linear movement. For example, using well known means known in the art, switch 24a could have a movement that is L-shaped to make it harder for accidental operation of the rocking mode to occur.

Accordingly, device 10 causes stroller 100 to rock forward and backward upon engagement of the rocking structure 40 after a forward movement of the stroller 100. For safety reasons, spring structure 22 is designed to unwind in approximately fifteen minutes thereby generating only approximately fifteen minutes of rocking. The reason is that an unlimited amount of rocking can generate fear in a parent that the stroller can move away on its own if, say, a foolish babysitter or other guardian would allow the rocking means to operate for a lengthy amount of time unguarded.

The device 10 itself is so simple that it may stand alone or be housed in a standard plastic or lightweight but sturdy housing (not shown). In that case, the entire device 10 except for the moving part of switch structure 24 is contained within housing (not shown).

Figure 5:
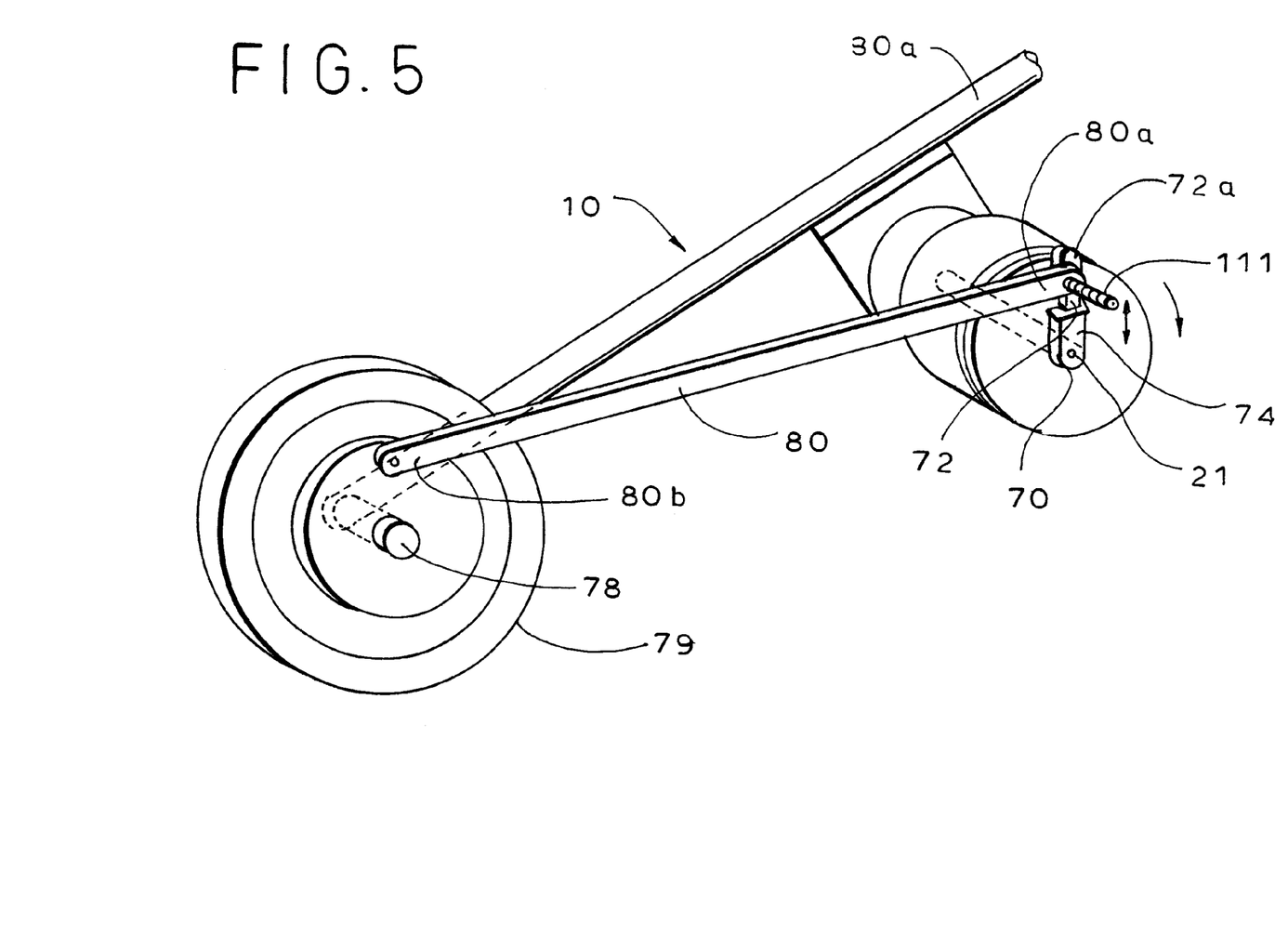
FIG. 5 is an enlarged fragmentary side elevational view of an alternative embodiment.

Alternatively, as seen from FIG. 5, the rocking structure and the winding structure may be combined into one structure. In that case, one of the wheels of stroller 100 shall be termed a rocking wheel 79. Rocking wheel 79 is mounted on a rocking wheel axle 78 that extends outward from rocking wheel 79. Spring structure 22 attached to frame member 30a includes a shaft 21 running through a center of the spring structure 22. First rod 70 is attached to shaft 21 and includes lever 72. Lever 72 is capable of assuming a plurality of lever positions.

The various positions of lever 72 are effectuated through well known means. For example, the user moves a handle 111 which is mounted on lever 72 by means of a handle shaft (not shown) connecting handle 11 to lever 72, which handle shaft serves as a pivot for second rod 80.

The various lever positions assumed by lever 72 change the degree to which second rod 80 is eccentrically mounted to spring structure 22. By changing this, device 10 can be shifted from winding mode to rocking mode. This is because as explained further below, and as can be seen from the drawings, particularly FIG. 5, when each end of second rod 80 is attached to an object that rotates—in this case a spring structure 22 attached on a first end 80a of second rod 80 and wheel axle extension 38 attached on a far end 80b of second rod 80—then if each end of second rod 80 is eccentrically mounted to the same degree (there is the same distance from the point of attachment of second rod 80 to a center of the rotating object), which is the position shown in FIG. 5, then there will be a transfer of rotational force from one object to the other when one of the objects (for example spring structure 22) is made to rotate. In contrast, if one of the ends of second rod 80 is more eccentrically mounted than the other end of second rod 80, a reciprocating motion will be induced in second rod 80 when one of the objects rotates and this will cause a rocking of the other object that is attached to the end that is more eccentrically mounted—i.e. where there is a greater distance from that end to the center of the rotating object.

Accordingly, by introducing a simple adjustment of position that alters the extent to which lever 72 is eccentrically mounted to spring structure 22, device 10 is shifted to rocking mode from winding mode. That is, spring structure 22 unwinds and this unwinding, which is rotational force, is converted to a reciprocating motion of second rod 80 and hence into a rocking of stroller wheel axle extension 38 to which a far end 80b of second rod 80 is eccentrically mounted.

Although the drawings, see FIG. 5, illustrate this a particular way in which lever 72 of first rod 70 assumes different lever positions, this embodiment of the present invention is not limited to this way and the present invention contemplates any way in which lever 72 can be made to assume different lever positions. As seen in FIG. 5, one method is to have first rod 70 have one end 70a attached to shaft 21 and first rod 70 includes both lever 72 and jacket 74. Lever 72 is telescoped within and projecting from jacket 74. Lever 72 is capable of assuming a plurality of lever positions measuring a degree to which the lever is telescoped within jacket 74.

A second rod 80 has a first end 80a mounted on an outer end 72a of lever 72. As a result, first end 80a of second rod 80 is eccentrically mounted to spring structure 22. Device 10 allows the user to adjust the degree of eccentricity, meaning how eccentrically mounted the second rod 80 is to the spring structure 22 by moving lever 72 to a particular selected position among the plurality of lever positions.

A far end 80b of the second rod 80 is eccentrically mounted to rocking wheel 79. The plurality of lever positions that lever 72 is capable of assuming includes an outer position that would be selected to wind spring structure 22 when the stroller is moving forward and an inner position selected to rock the stroller 100 when the stroller 100 is stationary. When the lever 72 is in the outer position, the rotational distance traveled by the first end of the second rod 80 is approximately equal to a rotational distance traveled by the far end of the second rod 80. When the lever 72 is in the inner position, the rotational distance of the first end 80a of the second rod 80 has a sufficiently smaller radius than a second radius of an arc traveled by the far end 80b of the second rod 80 if far end 80b were physically free to rotate 360 degrees of rotation. Far end 80b is thus unable to rotate through 360 degrees of rotation. Consequently, the unwinding of the spring structure 22 will cause a reciprocating motion by the second rod 80 and thereby rock the rocking wheel 79 and the stroller 100.

Another feature of the invention contemplates controlling the speed at which the automatic rocking takes place. The user can make the rocking motion faster or slower by adjusting a controller that adjusts the degree of resistance to unwinding that is inherent in spring structure 22.

Another feature of the embodiment shown in FIG. 5 involves including a well known means such as a slip clutch or other clutch mechanism (not shown in FIG. 5) to prevent accidental unwinding when stroller 100 is stationary.

The present invention both contemplates a stand alone device 10 that can be added to any stroller (or other vehicle) as well as a stroller that is manufactured together with such a device 10. If device 10 is included in stroller 100 during the manufacturing of stroller 100, stroller 100 shall comprise a stroller frame 101 that includes a stroller frame member 102, various numbers of stroller wheels which means at least three and typically four stroller wheels, at least one wheel axle extension 38 associated with at least one of the stroller wheels 36, spring structure 22 mounted on the stroller frame member 30, a winding structure 15 extending from the wheel axle extension 38 to the spring structure 22, a rocking structure 40 and a switch structure 24. In other words, all of the details of device 10 mentioned above apply also to a stroller 100 that is manufactured together with device 10 built into it.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof It is not desired to limit the invention to the exact construction and operation shown and described. The spirit and scope of this invention are limited only by the spirit and scope of the following claims.

What is claimed is:

1. In a stroller having a stroller frame member, at least three stroller wheels and at least one wheel axle extension associated with at least one stroller wheel, a device for automatically rocking the stroller, comprising:

a spring structure mounted on the stroller frame member, a winding structure extending from the wheel axle extension to the spring structure, said winding structure causing a forward winding of the spring structure upon a forward movement of the wheel axle extension, a rocking structure, including a rod mounted to the wheel axle extension, that converts an unwinding of the spring structure into a reciprocating motion of the rod, said reciprocating motion of the rod causing the wheel axle extension to alternately move forward and backward, a switch structure for switching between an activation of the winding structure during the forward movement of the stroller and an activation of the rocking structure when the stroller is stationary and a user desires to rock the stroller, the switch structure including overwinding prevention structure for preventing overwinding of the spring structure, said device causing the stroller to rock forward and backward upon engagement of the rocking structure after a forward movement of the stroller.

2. The device of claim 1, wherein the switch structure is a slip clutch for alternately engaging the winding structure and the rocking structure.

3. The device of claim 1, wherein a far end of the rod is eccentrically mounted to the wheel axle extension and wherein a forward end of the rod is sufficiently less eccentrically mounted to the spring structure to assure the reciprocating motion of the rod.

4. The device of claim 1, wherein the switch structure is a slip clutch for alternately engaging the winding structure and the rocking structure and wherein a far end of the rod is eccentrically mounted to the wheel axle extension and wherein a forward end of the rod is sufficiently less eccentrically mounted to the spring structure to assure the reciprocating motion of the rod.

5. The device of claim 1, wherein the winding structure comprises a connecting rod, a first end of the connecting rod eccentrically mounted to the spring structure and a second end of the connecting rod sufficiently equally eccentrically mounted to the wheel axle extension such that the forward movement of the stroller winds the spring structure.

6. The device of claim 1, wherein the rod has rack teeth on a far end of an underside of the rod and wherein said rack teeth are adapted to engage a pinion gear attached to the wheel axle extension.

7. The device of claim 1, wherein the switch structure is connected to the spring structure.

8. In a stroller having a stroller frame member, at least three stroller wheels and at least one wheel axle extension associated with at least one stroller wheel, a device for automatically rocking the stroller, comprising:

a spring structure mounted on the stroller frame member, the spring structure including overwinding prevention structure for preventing overwinding of the spring structure, a winding structure extending from the wheel axle extension to the spring structure, said winding structure causing a forward winding of the spring structure upon a forward movement of the wheel axle extension, a rocking structure, including a rod mounted to the wheel axle extension, that converts an unwinding of the spring structure into a reciprocating motion of the rod, said reciprocating motion of the rod causing the wheel axle extension to alternately move forward and backward, a switch structure for switching between an activation of the winding structure during the forward movement of the stroller and an activation of the rocking structure when the stroller is stationary and a user desires to rock the stroller, said device causing the stroller to rock forward and backward upon engagement of the rocking structure after a forward movement of the stroller.

9. In a stroller having a frame member, at least three stroller wheels and at least one wheel axle extension, a device for automatically rocking the stroller, comprising:

at least one of the stroller wheels comprising a rocking wheel, said rocking wheel mounted on a rocking wheel axle that extends outward from the rocking wheel, a spring structure attached to a frame member of the stroller, said spring structure including overwinding prevention structure for preventing overwinding of the spring structure, the spring structure including a shaft running through a center of the spring structure, a first rod attached to the shaft and including a lever, the lever capable of assuming a plurality of lever positions, a second rod, a first end of the second rod mounted on an outer end of the lever and thereby eccentrically mounted to the spring structure, a degree of eccentricity of a mounting of the second rod to the spring structure being adjustable by movement of the lever to a selected position among the plurality of lever positions, a far end of the second rod being eccentrically mounted to the rocking wheel, the plurality of lever positions including an outer position selected to wind the spring structure when the stroller is moving forward and an inner position selected to rock the stroller when the stroller is stationary, when the lever is in the outer position, a rotational distance traveled by the first end of the second rod being approximately equal to a rotational distance traveled by the far end of the second rod, and when the lever is in the inner position, the rotational distance of the first end of the second rod having a sufficiently smaller radius than a second radius of an arc traveled by the far end of the second rod that an unwinding of the spring structure will cause a reciprocating motion by the second rod and thereby rock the rocking wheel and the stroller.

10. The device of claim 9, wherein the first rod has one end attached to the shaft, the first rod also includes a jacket and the lever is telescoped within and projects from the jacket, the plurality of lever positions measuring a degree to which the lever is telescoped within the jacket.

11. The device of claim 9, wherein the lever includes a handle mounted thereon by means of a handle shaft.

12. A stroller that can be automatically rocked, comprising:

a stroller frame, the stroller frame including a stroller frame member, at least three stroller wheels, at least one wheel axle extension associated with at least one stroller wheel, a spring structure mounted on the stroller frame member, a winding structure extending from the wheel axle extension to the spring structure, said winding structure causing a forward winding of the spring structure upon a forward movement of the wheel axle extension, a rocking structure, including a rod mounted to the wheel axle extension, that converts an unwinding of the spring structure into a reciprocating motion of the rod, said reciprocating motion of the rod causing the wheel axle extension to alternately move forward and backward, a switch structure for switching between an activation of the winding structure during the forward movement of the stroller and an activation of the rocking structure when the stroller is stationary and a user desires to rock the stroller, the switch structure including overwinding prevention structure for preventing overwinding of the spring structure, said stroller rocking forward and backward upon engagement of the rocking structure after a forward movement of the stroller.

13. The stroller of claim 12, wherein the switch structure is a slip clutch for alternately engaging the winding structure and the rocking structure.

14. The stroller of claim 12, wherein a far end of the rod is eccentrically mounted to the wheel axle extension and wherein a forward end of the rod is sufficiently less eccentrically mounted to the spring structure to assure the reciprocating motion of the rod.

15. The stroller of claim 12, wherein the switch structure is a slip clutch for alternately engaging the winding structure and the rocking structure and wherein a far end of the rod is eccentrically mounted to the wheel axle extension and wherein a forward end of the rod is sufficiently less eccentrically mounted to the spring structure to assure the reciprocating motion of the rod.

16. The stroller of claim 12, wherein the winding structure comprises a connecting rod, a first end of the connecting rod eccentrically mounted to the spring structure and a second end of the connecting rod sufficiently equally eccentrically mounted to the wheel axle extension such that the forward movement of the stroller winds the spring structure.

17. The stroller of claim 12, wherein the rod has rack teeth on a far end of an underside of the rod and wherein said rack teeth are adapted to engage a pinion gear attached to the wheel axle extension.

18. The stroller of claim 12, wherein the switch structure is connected to the spring structure.

19. A stroller that can be automatically rocked, comprising:

a stroller frame, the stroller frame including a stroller frame member, at least three stroller wheels, at least one wheel axle extension associated with at least one stroller wheel, a spring structure mounted on the stroller frame member, the spring structure including overwinding prevention structure for preventing overwinding of the spring structure, a winding structure extending from the wheel axle extension to the spring structure, said winding structure causing a forward winding of the spring structure upon a forward movement of the wheel axle extension, a rocking structure, including a rod mounted to the wheel axle extension, that converts an unwinding of the spring structure into a reciprocating motion of the rod, said reciprocating motion of the rod causing the wheel axle extension to alternately move forward and backward, a switch structure for switching between an activation of the winding structure during the forward movement of the stroller and an activation of the rocking structure when the stroller is stationary and a user desires to rock the stroller, said stroller rocking forward and backward upon engagement of the rocking structure after a forward movement of the stroller.

20. A stroller that can be automatically rocked, comprising:

a stroller frame, the stroller frame including a stroller frame member, at least three stroller wheels, at least one of the stroller wheels comprising a rocking wheel, said rocking wheel mounted on a rocking wheel axle that extends outward from the rocking wheel, a spring structure attached to a frame member of the stroller, said spring structure including overwinding prevention structure for preventing overwinding of the spring structure, the spring structure including a shaft running through a center of the spring structure, a first rod attached to the shaft and including a lever, the lever capable of assuming a plurality of lever positions, a second rod, a first end of the second rod mounted on an outer end of the lever and thereby eccentrically mounted to the spring structure, a degree of eccentricity of a mounting of the second rod to the spring structure being adjustable by movement of the lever to a selected position among the plurality of lever positions, a far end of the second rod being eccentrically mounted to the rocking wheel, the plurality of lever positions including an outer position selected to wind the spring structure when the stroller is moving forward and an inner position selected to rock the stroller when the stroller is stationary, when the lever is in the outer position, a rotational distance traveled by the first end of the second rod being approximately equal to a rotational distance traveled by the far end of the second rod, and when the lever is in the inner position, the rotational distance of the first end of the second rod having a sufficiently smaller radius than a second radius of an arc traveled by the far end of the second rod that an unwinding of the spring structure will cause a reciprocating motion by the second rod and thereby rock the rocking wheel and the stroller.

21. The stroller of claim 20, wherein the first rod has one end attached to the shaft, the first rod also includes a jacket and the lever is telescoped within and projects from the jacket, the plurality of lever positions measuring a degree to which the lever is telescoped within the jacket.

22. The stroller of claim 20, wherein the lever includes a handle mounted thereon by means of a handle shaft.

* * * * *